United States Patent
Cai et al.

(10) Patent No.: US 8,488,514 B2
(45) Date of Patent: Jul. 16, 2013

(54) RELAY BACKHAUL LINK QUALITY CONSIDERATIONS FOR MOBILITY PROCEDURES

(75) Inventors: Zhijun Cai, Irving, TX (US); Rose Qingyang Hu, Irving, TX (US); Yi Yu, Irving, TX (US); Andrew Mark Earnshaw, Kanata (CA); Yi Song, Irving, TX (US); Mo-Han Fong, Kanata (CA)

(73) Assignee: Research In Motion Limited, Waterloo, Ontario (CA)

(*) Notice: Subject to any disclaimer, the term of this patent is extended or adjusted under 35 U.S.C. 154(b) by 587 days.

(21) Appl. No.: 12/572,927

(22) Filed: Oct. 2, 2009

(65) Prior Publication Data

US 2011/0080864 A1   Apr. 7, 2011

(51) Int. Cl.
| | |
|---|---|
| H04W 36/00 | (2009.01) |
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |

(52) U.S. Cl.
USPC ........... 370/315; 370/328; 370/331; 370/332; 370/336; 370/338; 375/346

(58) Field of Classification Search
USPC ........................................................ 370/315
See application file for complete search history.

(56) References Cited

U.S. PATENT DOCUMENTS

| | | | |
|---|---|---|---|
| 6,421,327 B1 * | 7/2002 | Lundby et al. | 370/310 |
| 7,127,253 B2 | 10/2006 | Chen | |
| 7,184,497 B2 * | 2/2007 | Jeske et al. | 375/346 |
| 7,493,120 B2 | 2/2009 | Kim et al. | |
| 8,275,386 B2 * | 9/2012 | Khan | 455/452.2 |
| 2002/0173310 A1 | 11/2002 | Ebata et al. | |
| 2003/0129985 A1 * | 7/2003 | Naden et al. | 455/447 |
| 2004/0151108 A1 * | 8/2004 | Blasco Claret et al. | 370/206 |
| 2004/0184398 A1 * | 9/2004 | Walton et al. | 370/203 |
| 2004/0240586 A1 * | 12/2004 | Li et al. | 375/329 |
| 2005/0265436 A1 * | 12/2005 | Suh et al. | 375/221 |
| 2006/0056365 A1 * | 3/2006 | Das et al. | 370/338 |
| 2006/0227909 A1 * | 10/2006 | Thomas et al. | 375/346 |
| 2006/0256848 A1 * | 11/2006 | Medvedev et al. | 375/227 |

(Continued)

FOREIGN PATENT DOCUMENTS

| | | |
|---|---|---|
| KR | 20080025070 A | 3/2008 |
| KR | 20090093951 A | 9/2009 |
| WO | 2006138122 A2 | 12/2006 |
| WO | 2008057669 A2 | 5/2008 |

OTHER PUBLICATIONS

Cai, Zhijun, et al.; U.S. Appl. No. 12/572,949, filed Oct. 2, 2009; Title: Determining Link Quality for Networks Having Relays.

(Continued)

*Primary Examiner* — Ian N Moore
*Assistant Examiner* — Jenee Alexander
(74) *Attorney, Agent, or Firm* — Conley Rose, P.C.; J. Robert Brown, Jr.

(57) ABSTRACT

A system including a processor configured to determine whether or not to perform a mobility procedure based at least in part on a backhaul link quality between a relay node and an access node.

18 Claims, 3 Drawing Sheets

U.S. PATENT DOCUMENTS

| | | | |
|---|---|---|---|
| 2007/0010271 | A1 | 1/2007 | Roy |
| 2007/0026813 | A1* | 2/2007 | Khan .............................. 455/69 |
| 2007/0153687 | A1* | 7/2007 | Attar et al. .................... 370/229 |
| 2007/0253388 | A1* | 11/2007 | Pietraski ....................... 370/338 |
| 2008/0043679 | A1* | 2/2008 | Karlsson et al. .............. 370/335 |
| 2008/0080414 | A1* | 4/2008 | Thubert et al. ............... 370/328 |
| 2008/0080436 | A1* | 4/2008 | Sandhu et al. ................ 370/338 |
| 2008/0242225 | A1* | 10/2008 | Krishnamoorthi et al. ........ 455/9 |
| 2009/0047954 | A1* | 2/2009 | Tenny et al. .............. 455/435.3 |
| 2009/0195444 | A1* | 8/2009 | Miller ........................... 342/352 |
| 2009/0264123 | A1* | 10/2009 | Agashe et al. ................ 455/434 |
| 2010/0040172 | A1* | 2/2010 | Onggosanusi et al. ........ 375/299 |
| 2010/0081467 | A1* | 4/2010 | Alex et al. ..................... 455/509 |
| 2010/0159991 | A1* | 6/2010 | Fu et al. ........................ 455/561 |
| 2011/0064153 | A1* | 3/2011 | Khan ............................. 375/260 |
| 2012/0099457 | A1* | 4/2012 | Roy ............................... 370/252 |

OTHER PUBLICATIONS

3GPP TS 36.300v8.9.0; 3rd Generation Partnership Project; Technical Specfication Group Radio Access Network; Evolved Universal Terrestrial Radio Access (E-UTRA) and Evolved Universal Terrestrial Radio Access Network (E-UTRAN); Overall description; Stage 2; Release 8; Jun. 2009; 159 pgs.

3GPP TS 36.304v8.6.0; 3rd Generation Partnership Project; Technical Specification Group Radio Access Network; Evolved Universal Terrestrial Radio Access (E-UTRA); User Equipment (UE) Procedures in Idle Mode; Release 8; Jun. 2009; 30 pgs.

3GPP TS 36.331v8.6.0; 3rd Generation Partnership Project; Technical Specification Group Radio Access Network; Evolved Universal Terrestrial Radio Access (E-UTRA) Radio Resource Control (RRC); Protocol Specification; Release 8; Jun. 2009; 207 pgs.

3GPP TS 36.213v8.7.0; 3rd Generation Partnership Project; Technical Specfication Group Radio Access Network; Evolved Universal Terrestrial Radio Access (E-UTRA); Physical Layer Procedures; Release 8; May 2009; 77 pgs.

3GPP TR 36.814v0.4.1; 3rd Generation Partnership Project; Technical Specification Group Radio Access Network; Further Advancement for E-UTRA Physical Layer Aspects; Release 9; Feb. 2009; 31 pgs.

Research in Motion UK Limited; Title: Type-II Relay Reference Signal Transmission and UE Association; R1-092419; 3GPP TSG RAN WG1 Meeting #57bis; Los Angeles, USA; Jun. 29-Jul. 3, 2009; 4 pgs.

Office Action dated Nov. 21, 2011; U.S. Appl. No. 12/572,949, filed Oct. 2, 2009; 20 pages.

European Examination Report; Application No. 10184537.8; Dec. 7, 2011; 6 pgs.

Korean Office Action; Application No. 10-2010-0096531; Dec. 14, 2011; 8 pgs.

Notice of Allowance dated May 18, 2012; U.S. Appl. No. 12/572,949, filed Oct. 2, 2009; 19 pages.

European Examination Report; Application No. 10184537.8; Jun. 13, 2012; 5 pages.

Extended European Search Report; Application No. 10184537.8; Jan. 25, 2011; 10 pgs.

3GPP TSG RAN WG2 #70; "Issues on Cell Selection/Reselection in Type 1 Relay System"; Hitachi, Ltd.; May 10-14, 2010; 3 pgs.; R2-103096; Montreal, Canada.

3GPP TSG RAN WG1 #59; "Serving Cell Selection in a Heterogeneous Network with Type 1 Relay"; Research in Motion, UK Limited; Nov. 9-13, 2009; 3 pgs; R1-094463; Jeju, Korea.

3GPP TSG-RAN WG1 #56; "Measurements in Support of LTE-A Techniques"; Qualcomm Europe; Feb. 9-13, 2009; 2 pgs.; R1-090859; Athens, Greece.

3GPP TS 36.304 V9.0.0; 3rd Generation Partnership Project; Technical Specification Group Radio Access Network; Evolved Universal Terrestrial Radio Access (E-UTRA); User Equipment (UE) Procedures in Idle Mode; Release 9; Sep. 2009; 30 pgs.

Extended European Search Report; Application No. 10184468.6; Feb. 4, 2011; 7 pgs.

Korean Office Action; Application No. 10-2010-0096529; Sep. 1, 2011; 12 pages.

Teyeb, Oumer, et al.; "Handover Framework for Relay Enhanced LTE Networks"; IEEE; 2009; 5 pages.

ETSI TS 136 304 V8.2.0; LTE; Evolved Universal Terrestrial Radio Access (E-UTRA); User Equipment (UE) Procedures in Idle Mode (3GPP TS 36.304 version 8.2.0 Release 8); Nov. 2008; 29 pages.

Zheng, Kan, et al.; "Multihop Cellular Networks Toward LTE-Advanced"; IEEE Vehicular Technology Magazine; Sep. 2009; 8 pages.

Office Action dated Feb. 6, 2012; U.S. Appl. No. 12/572,949, filed Oct. 2, 2009; 5 pages.

European Examination Report; Application No. 10184468.6; Jan. 19, 2012; 6 pages.

Japanese Office Action; Application No. 2010-225224; Jan. 24, 2012; 7 pages.

Japanese Office Action; Application No. 2010-225222; Jan. 24, 2012; 7 pages.

Australian Examination Report; Application No. 2010226889; Jul. 27, 2012; 3 pages.

European Examination Report; Application No. 10184468.6; Sep. 20, 2012; 5 pages.

Australian Examination Report; Application No. 2010226930; Aug. 3, 2012; 3 pages.

Canadian Office Action; Application No. 2,716,096; Jan. 16, 2013; 4 pages.

Chinese Office Action; Application No. 201010512788.6; Jan. 15, 2013; 12 pages.

Canadian Office Action; Application No. 2,716,297; Feb. 18, 2013; 3 pages.

Chinese Office Action; Application No. 201010512740.5; Feb. 27, 2013; 16 pages.

European Examination Report; Application No. 10184537.8; Jan. 8, 2013; 4 pages.

European Examination Report; Application No. 10184468.6; May 10, 2013; 5 pages.

* cited by examiner

RELAY BACKHAUL LINK QUALITY CONSIDERATIONS FOR MOBILITY PROCEDURES

BACKGROUND

As used herein, the terms "device," "user equipment," and "UE" might in some cases refer to mobile devices such as mobile telephones, personal digital assistants, handheld or laptop computers, Blackberry® devices, and similar devices that have telecommunications capabilities. Such a UE might consist of a UE and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long-Term Evolution (LTE) and LTE-Advanced (LTE-A). For example, an LTE or LTE-A system might be an Evolved Universal Terrestrial Radio Access Network (E-UTRAN) and include an E-UTRAN node B (or eNB), a wireless access point, or a similar component rather than a traditional base station. As used herein, the term "access node" refers to any component of the wireless network, such as a traditional base station, a wireless access point, or an LTE or LTE-A node B or eNB, that creates a geographical area of reception and transmission coverage allowing a UE or a relay node to access other components in a telecommunications system. In this document, the term "access node" and "access device" may be used interchangeably, but it is understood that an access node may comprise a plurality of hardware and software.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used throughout the specification, claims, and Figures, the following terms have the following definitions. Unless stated otherwise, all terms are defined by and follow the standards set forth by the Third Generation Partnership Program (3GPP) technical specifications.

"ACK" is defined as "Acknowledgment," such as an acknowledgement signal.

"CQI" is defined as "Channel Quality Indicator."

"EPC" is defined as "Enhanced Packet Core."

"E-UTRA" is defined as "Evolved Universal Terrestrial Radio Access."

"E-UTRAN" is defined as "Evolved Universal Terrestrial Radio Access Network."

"HARQ" is defined as "Hybrid Automatic Repeat Request."

"IE" is defined as "Information Element."

"LTE" is defined as "Long Term Evolution," which refers to a set of wireless communication protocols, systems, and/or software.

"LTE-A" is defined as "Long Term Evolution, Advanced," which refers to a set of wireless communication protocols, systems, and/or software newer than LTE.

"MCS" is defined as "Modulation and Coding Scheme."

"MME" is defined as "Mobility Management Entity."

"NAS" is defined as "Non Access Stratum."

"PLMN" is defined as "Public Land Mobile Network."

"RAN" is defined as "Radio Access Network."

"RAT" is defined as "Radio Access Technology."

"RF" is defined as "Radio Frequency."

"RN" is defined as "Relay Node."

"RRC" is defined as "Radio Resource Control."

"RSRP" is defined as "Reference Signal Received Power."

"SGW" is defined as "Serving Gateway."

"SNR" is defined as "Signal to Noise Ratio."

"SR" is defined as "Scheduling Request."

"TAU" is defined as "Tracking Area Update."

"Un" is defined as the interface between the RN and the donor eNB.

"Uu" is defined as the interface between a UE and a RN.

The embodiments described herein relate to techniques for improving UE mobility procedures in at least a Type 1 relay network. Specifically, the embodiments provide techniques for taking into account composite, end-to-end signal to noise ratios with respect to RNs and corresponding access nodes when performing a mobility procedure. Mobility procedures include cell selection, cell reselection, and/or handover procedures for a UE.

In networks without RNs, normally only one wireless connection is established before communications reach the remaining wired portion of the network, which might be an EPC. In the following description, we use the EPC as an example. However, other types of the core networks are possible as well. The one wireless connection is typically the wireless link between the UE and the access node, such as an eNB. The connection between the access node and the EPC is usually hard wired and has good transmission characteristics, e.g., much lower bit error rate and more consistent channel conditions.

However, in networks with RNs, multiple wireless links might be established in a chain of links between the UE and the core network, such as the EPC. For example, a UE might wirelessly connect to a RN, which then wirelessly connects to an access node, which then connects to the EPC. Additional RNs or access nodes might also be present in this chain, and the connection to the EPC might even be wireless.

Any time a wireless link is established, signal quality might become an issue due to various wireless channel characteristics, such as the multipath effect and the shadowing effect, that should be taken into consideration when the UE moves around. Low signal quality can hinder performance at the UE, in terms of slowing the reception of data, corrupting data, reducing spectral efficiency, or even causing transmission of data to fail.

For networks without RNs that have only one wireless connection between the UE and the EPC, the selection of an access node is relatively simple. The UE may measure the qualities of the signals from the nearby access nodes, and then select the access node with the best signal quality, or select the access node based on some other criteria. Therefore, cell selection or reselection may be based on the link quality between the UE and the eNB when UE is in IDLE mode. This technique may also be used for the handover procedure when the UE is in CONNECTED mode.

For networks with RNs and/or multiple wireless connections, the selection of an access node or a RN for communication can be more complex. The reason for additional complexity is because a RN providing the best directly measurable signal quality among all access nodes and RNs might not provide the best overall signal quality in terms of moving data back and forth between the UE and the EPC. The overall signal quality may be affected by the signal quality between an RN and an access node. The overall signal quality may also be referred to as the composite signal quality. For a UE connected to an eNB, the composite signal quality is the signal quality of the wireless link between the UE and the access node, for example the eNB. For a UE connected to a RN, the composite signal is the overall signal quality of two wireless links. One wireless link is between the UE and the RN and the other wireless link is between the RN and the access node.

The link between a RN and an access node may be referred to as a backhaul link. The signal quality of the backhaul link affects the overall signal quality between the UE and the EPC. For example, even if the signal quality between the UE and RN 1 is very good, if the signal quality between RN 1 and eNB 1 is very low, then the composite signal quality between the UE and eNB 1 is likely to be low. However, even if the signal quality between the UE and RN 2 is mediocre, if the signal quality between RN 2 and eNB 1 is very good, then the composite signal quality between the UE and eNB 1 (through RN 2) may be better than the other composite signal quality between the UE and eNB 1 (through RN 1).

The effect of the backhaul link signal quality on the composite signal quality is not necessarily straightforward. For example, the composite signal quality is not necessarily the lesser of the access link signal quality and the backhaul link signal quality. Techniques for determining the composite signal quality are given below.

As a result of the possible existence of reduced backhaul link signal quality, a UE that chooses (selects, reselects, or hands-over) a RN only based on the access link signal quality may not choose the node, either an access node or a RN, leading to the best composite signal quality between the UE and the EPC. It is possible that the best overall link might be generated by an eNB with a lower access link signal quality, which could still be higher than the composite signal quality if the UE is connected to the selected RN. It is also possible that the best overall link might be generated by a different RN with a lower access link signal quality, but which connects to a chain of links having a better composite signal quality. The embodiments described herein provide for techniques for allowing the UE to choose the RN associated with the best composite signal quality, thereby improving data throughput, transmission quality, and spectral efficiency.

Figure 1:
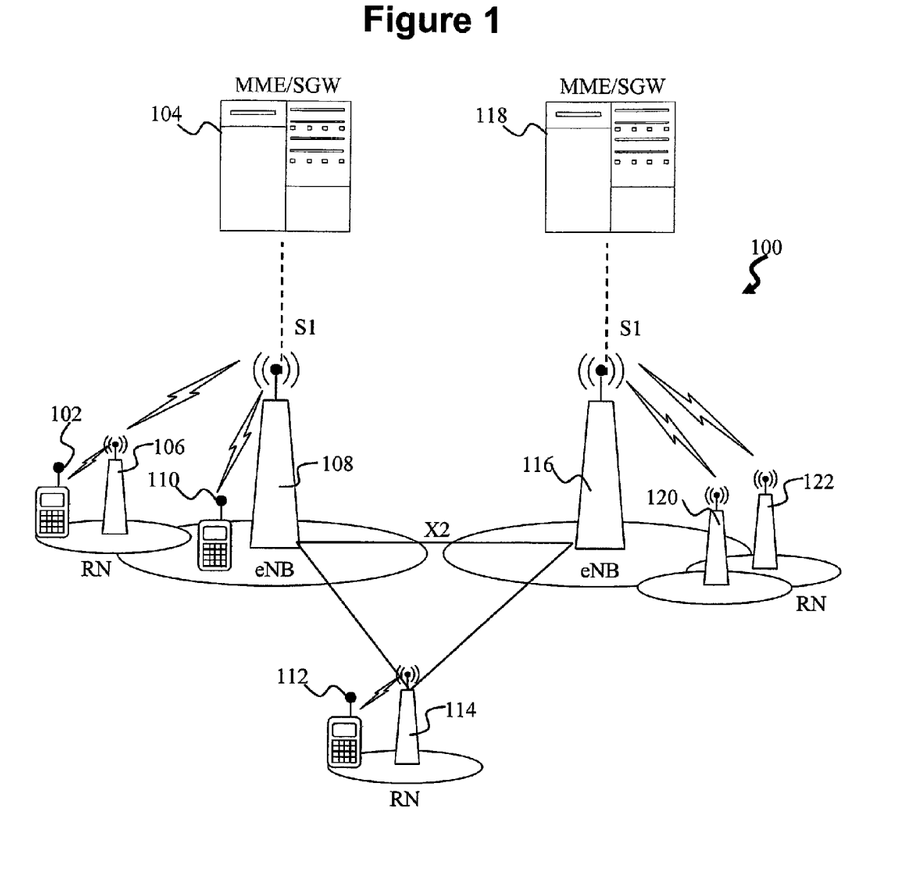
FIG. 1 is a diagram of a communication system, according to an embodiment of the disclosure.

FIG. 1 is a diagram of a communication system, according to an embodiment of the disclosure. Communication system 100 represents an architecture of an LTE-A system.

A RN is a device that facilitates communication with an eNB. RNs, generally, can be divided into three groups: layer 1 RNs, layer 2 RNs, and layer 3 RNs. A layer 1 RN may be a repeater that merely retransmits a received signal without any modification other than amplification and possibly slight delay. A layer 2 RN can demodulate/decode a transmission that it receives, re-encode/modulate the result of the decoding, and then transmit the modulated data. A layer 3 RN may have full radio resource control capabilities and can thus function similarly to an access node. The radio resource control protocols used by a RN may be the same as those used by an access node, and the RN may have a unique cell identity typically used by an access node. A "layer x" RN is distinguished from a "Type x" RN. For example, a layer 1 RN is not a Type 1 RN; in fact, a Type 1 RN is functionally similar to a layer 3 RN. Type 1 RNs are described in greater detail below.

For the purpose of this disclosure, a RN is distinguished from an eNB or other access node by the fact that a RN requires the presence of at least one eNB or other access node (and the cell associated with that access node) and possibly other RNs to access other components in a telecommunications system, such as a MME/SGW. Additionally, for the purposes of this disclosure, the term "eNB" is not limited to only an "evolved node-B," but also may refer to any type of access node suitable for communicating with an MME/SGW or a component of an enhanced packet core.

In an example of operation of a RN, UE 102 communicates with MME/SGW 104 via RN 106 and eNB 108. In particular, UE 102 communicates with RN 106, which in turn communicates with eNB 108, which in turn communicates with MME/SGW 104 via an interface, such as the S1 interface identified by the phantom line. However, a UE, such as UE 110, could communicate directly with an eNB, such as eNB 108.

In another embodiment, a UE, such as UE 112, could communicate with a RN, such as RN 114, that itself communicates with two or more different eNBs, such as eNB 108 and eNB 116. The eNB 116 may be in communication with a different MME/SGW, such as MME/SGW 118, via an interface, such as the S1 interface identified by the phantom line. If the RN 114 is connected to eNB 108, then the cell generated by eNB 108 may be said to be the donor cell. In an embodiment, eNB 108 and eNB 116 may communicate with each other, for example, via the X2 interface identified by the line connecting eNB 108 and eNB 116.

The above examples describe eNBs servicing only one or two RNs; however, each eNB may communicate with more or fewer RNs. Other arrangements of the identified components are possible, and more, fewer, different, or additional components may be present.

RNs are one exemplary mechanism that 3GPP LTE-Advanced has used to further evolve the LTE RAN. In LTE-Advanced (LTE-A), relay technology is used to improve average cell throughput and enhance cell coverage. Further, the inclusion of RNs in the LTE-A system is also intended for the purposes of efficiently extending the UE's battery life, of increasing UE throughput, and of extending cell coverage.

One of the issues presented by the inclusion of RNs is that calculating the overall signal quality between the UE and the MME/SGW is complicated by the presence of more than one communication link. For example, while the connection between the MME and the eNB is often a wired link of good quality, the signal qualities of the link between the UE and the access node, the link between the UE, and the RN and the link between the RN and the eNB may all need to be considered when determining which access node or RN a UE should attempt to connect to or camp on during a mobility procedure. Mobility procedures include cell selection, cell reselection, handover, or more generally, any mobility procedure that the UE may perform. In the embodiments described herein, the link between the UE and the RN may be referred to as the access link and the link between the RN and the eNB may be referred to as a backhaul link. However, other names may be used. Additionally, for more complex communications systems, multiple backhaul links may exist if additional RNs are between the UE-accessed RN and the eNB. Still further, multiple backhaul links could potentially exist as well. Other arrangements are also possible, all of which are within the spirit and scope of the present disclosure.

In an example of determining which eNB or RN a UE should connect to, UE 112 is connected to RN 114; however, the UE 112 could connect to or camp on either eNB 108 or eNB 116 via RN 114. To determine which connection presents the optimum overall signal quality, an examination may be made of the signal quality between RN 114 and eNB 108 versus the signal quality between RN 114 and eNB 116.

In another example of determining which eNB or RN a UE should connect to, UE 110 may have two choices. The first choice is to directly connect to the eNB 108 and the second choice is to connect to the RN 106 and then the RN 106 connects to the eNB 108. To determine which connection presents the optimum overall signal quality or spectrum efficiency, an examination may be made between these two different connections. The embodiments described herein relate to methods and/or devices for making and/or processing these measurements.

In a particular non-limiting embodiment, any of RN 106, RN 114, RN 120, or RN 122 may be Type 1 RNs. One of the embodiments described herein relates to handling a UE IDLE mode mobility procedure in a Type 1 relay network while considering the backhaul link quality between a donor eNB and the Type 1 RN. Another one of the embodiments described herein relates to handling a UE CONNECTED mode mobility procedure, such as a handover procedure in a Type 1 relay network, while considering the backhaul link quality between a donor eNB and the Type 1 RN. Yet another one of the embodiments described herein relates to handling a UE transiting from IDLE mode to the CONNECTED mode in a Type 1 relay network while considering the backhaul link quality between a donor eNB and the Type 1 RN. In some other embodiments, these RNs might be Type 2 or any of Layer 1, 2, or 3 relays, and the techniques of the present disclosure might be employed in any case.

Figure 2:
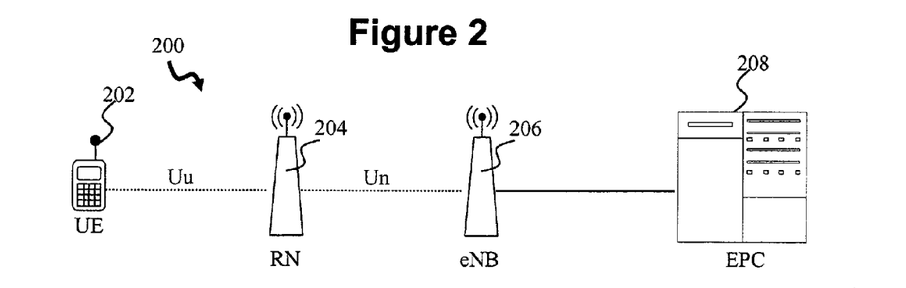
FIG. 2 is a diagram of a communication system, according to an embodiment of the disclosure.

FIG. 2 is a diagram of a communication system, according to an embodiment of the disclosure. Communication system 200 may be a simplified communication system relative to communication system 100 of FIG. 1 and used to more readily illustrate the present systems. In FIG. 2, UE 202 communicates with RN 204, as designated by the phantom line labeled "Uu." RN 204 communicates with eNB 206, as designated by the phantom line labeled "Un." The eNB 206 communicates with EPC 208. Although EPC 208 is represented by a server computer, EPC 208 may be one or more hardware and/or software components or well-known telecommunication systems, possibly linked via a network, that may be used to facilitate communication between UE 202 and some other UE (not shown).

In an embodiment, LTE-A extends earlier LTE releases, such as LTE Release 8 or LTE Release 9, providing support for relaying as a tool to improve a variety of aspects of wireless communication, including but not limited to coverage of high data rates, group mobility, temporary network development, cell-edge throughput and/or provision of coverage in new areas. In an embodiment, the RN 204 is wirelessly connected to a donor cell of a donor eNB 206 via the Un interface. The UE 202 connects to the RN 204 via the Uu interface.

The Un connection may be one of two or more types. One type of Un connection may be "in band." For an "in band" connection, the eNB to RN link may share the same frequency band with direct eNB to UE links within the donor cell. Another type of Un connection may be "out of band." For an "out of band" connection, the eNB to RN link may not operate in the same frequency band as direct eNB to UE links within the donor cell.

The 3GPP specifications such as the TR 36.814 provide that at least Type 1 RNs are part of LTE-A networks. A Type 1 RN may be an in band RN having characteristics described in the following paragraph, although this is not meant to be limiting and a Type 1 RN could instead have an out of band backhaul. A Type 1 RN can be defined such that it has its own physical cell identification and either a partial or complete RRC protocol stack. A Type 1 RN could be a Layer 3 RN.

A cell controlled by a Type 1 RN may appear to a UE as a separate cell distinct from the donor cell. Each cell may have its own physical cell identification, defined in LTE Release 8, and the RN may transmit its own synchronization signals, reference symbols, and other information. In the context of single cell operation, the UE may receive scheduling information and HARQ feedback directly from the RN, and send its own control channels (such as SR, CQI, and ACK) to the RN. The Type 1 RN may appear as a Release 8 eNB to Release 8 UEs, thereby establishing backwards compatibility. For LTE-A UEs, a Type 1 RN may appear differently than a Release 8 eNB in order to allow for further performance enhancements.

IDLE Mode Mobility Procedures

As described above, the embodiments described herein provide for techniques for improving UE mobility procedures in a Type 1 RN. The embodiments may also be applied to other types of RNs, though for the sake of example only, the procedures for IDLE mode mobility procedures are described with respect to Type 1 RNs.

UE procedures in IDLE mode may include two steps: cell selection, and cell reselection. When a UE is powered on, the UE may select a suitable cell based on IDLE mode measurements and cell selection criteria. The term "suitable cell" as used herein is a cell on which the UE may camp to obtain normal service. A cell may be considered "suitable" if the cell fulfills the cell selection criteria "S", which is defined by the equation:

Srxlev>0

Where $$Srxlev = Qrxlevmeas - (Qrxlevmin + Qrxlevminoffset) - Pcompensation$$

These terms are defined as:

| | |
|---|---|
| Srxlev | Cell Selection RX level value (dB) |
| $Q_{rxlevmeas}$ | Measured cell RX level value (RSRP). |
| $Q_{rxlevmin}$ | Minimum required RX level in the cell (dBm) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| Pcompensation | $\max(P_{EMAX} - P_{UMAX}, 0)$ (dB) |
| $P_{EMAX}$ | Maximum TX power level an UE may use when transmitting on the uplink in the cell (dBm) defined as $P_{EMAX}$ in [TS 36.101] |
| $P_{UMAX}$ | Maximum RF output power of the UE (dBm) according to the UE power class as defined in [TS 36.101] |

Regarding the step of cell selection, the UE may use one or both of the following cell selection procedures. One of the two cell selection procedures is initial cell selection. This procedure uses no prior knowledge regarding which RF channels are E-UTRA carriers. The UE may scan all RF channels in the E-UTRA bands according to the UE capabilities to find a suitable cell. On each carrier frequency, the UE might only search for the strongest cell. Once a suitable cell is found, the suitable cell may be selected.

The other of the two cell selection procedures is to use stored information cell selection. This procedure uses stored information of carrier frequencies, and optionally also information on cell parameters, from previously received measurement control information elements or from previously detected cells. Once the UE has found a suitable cell the UE may select the suitable cell. If no suitable cell is found, then the initial cell selection procedure described above may be started.

Later, cell reselection is another step in UE procedures for IDLE mode. When camped on a cell, the UE may regularly search for a more suitable cell according to cell reselection criteria. If a more suitable cell is found, then the more suitable cell may be selected by the UE to camp on.

In the case of E-UTRAN inter-frequency and inter-RAT cell reselection, priority-based reselection criteria may be applied. Absolute priorities of different E-UTRAN frequencies or inter-RAT frequencies may be provided to the UE in the system information or in the RRCConnectionRelease message, or may be provided by inheriting these frequencies from another RAT at inter-RAT cell selection or reselection.

In the case of intra-frequency and equal priority inter-frequency cell reselection, a cell ranking procedure may be applied in order to identify the most suitable cell. The cell ranking criteria may be defined as $R_s$ for serving cells and may be defined as "$R_n$" for neighboring cells (also known as the cell reselection criteria R). These terms may be defined by the following equations:

$$R_s = Q_{meas,s} + Q_{Hyst}$$

$$R_n = Q_{meas,n} + Q_{offset}$$

where

| | |
|---|---|
| $Q_{meas}$ | RSRP measurement quantity used in cell reselections. |
| $Q_{offset}$ | For intra-frequency: Equal to $Qoffset_{s,n}$, if $Qoffset_{s,n}$ is valid, otherwise this equals to zero. For inter-frequency: Equal to $Qoffset_{s,n}$ plus $Qoffset_{frequency}$, if $Qoffset_{s,n}$ is valid, otherwise this equals to $Qoffset_{frequency}$. |
| $Q_{Hyst}$ | Specifies the hysteresis value for ranking criteria, broadcast in serving cell system information |

The UE may perform ranking of all cells that fulfill the cell selection criteria, S. The cells may be ranked according to the R criteria specified above, deriving $Q_{meas,n}$ and $Q_{meas,s}$ and calculating the R values using averaged RSRP results. If a cell is ranked as the most suitable cell, the UE may perform cell reselection to that cell.

Additional restrictions may apply to cell reselection. In an embodiment, the UE may reselect the new cell only if the following two conditions are met. First, the new cell is better ranked than the serving cell during a time interval "$T_{reselectionRAT}$". Second, more than one second has elapsed since the UE camped on the current serving cell.

Type 1 Relay Backhaul Link Quality

In a communication network having RNs, when the UE connects to a RN, two-hop radio communication occurs, rather than a traditional single hop radio communication. For example, communication from a UE to a RN and from the RN to an eNB involves two wireless hops, as opposed to communication from a UE to an eNB, which involves only one hop. Multi-hop communication includes two or more such hops.

As discussed above, the overall link throughput between the eNB and the UE may be not only dependent on the link quality between the RN and the UE, which is the access link, but also may be dependent on the link quality between the eNB and the RN, which is the backhaul link. For example, if the link quality of the access link is very good, but the link quality of the backhaul link is relatively worse, then the overall end-to-end link quality is not good. The link quality is bottlenecked by the backhaul link, in this particular case.

In general, the backhaul link should be relatively good. However, in the case of mobile or nomadic RNs, the backhaul link quality may become worse and may also be time-variant. In one embodiment, an end-to-end SNR for two-hop radio communication may be derived as shown by the following expression. The end-to-end SNR for two-hop or multi-hop communications may be referred to as a composite signal quality, because both the backhaul link signal quality and the access link signal quality are used in determining the end-to-end SNR.

$$SNR_{end\text{-}to\text{-}end} = \cfrac{1}{\left(\cfrac{1}{SNR_{access\_link}} + \cfrac{1}{SNR_{backhaul\_link}}\right)} \qquad \text{(Equation 1)}$$

In equation 1, $SNR_{access\_link}$ is the SNR over the access link, and $SNR_{backhaul\_link}$ is the SNR over the backhaul link. From equation (1), it is seen that both the access link and the backhaul link might contribute equal weight to the overall link quality. In the fixed relay case, $SNR_{backhaul\_link}$ changes very slowly, mostly due to the shadowing effect change. In the mobile relay case, $SNR_{backhaul\_link}$ may change at a similar rate to $SNR_{access\_link}$.

In one embodiment, the UE may directly measure the $SNR_{access\_link}$. The UE may receive from one or both of the RN or eNB a measurement report of the $SNR_{backhaul\_link}$. Thus, the UE may perform the calculation of $SNR_{end\text{-}to\text{-}end}$ (the composite signal quality) according to equation 1. Alternatively, any other component in the network, including the RN, eNB, or EPC, may calculate the $SNR_{end-to-end}$ so long as the component either measures or receives a measurement of the values of the $SNR_{access\_link}$ and the $SNR_{backhaul\_link}$. Other techniques may be used for calculating or using the $SNR_{end-to-end}$, such as but not limited to those described below.

A UE connected to a RN might use two-hop bandwidth to complete one transmission, compared with a one-hop transmission if that UE is connected directly to an eNB. A UE might receive a higher SNR from the relay, but the total amount of resources used for two hops, the access link and the backhaul link, could be larger than a single hop transmission on the direct link from the UE to the eNB. From a spectrum efficiency point of view, the UE should select a node that not only provides the best SNR but which also achieves the highest spectrum efficiency. In an embodiment, the bandwidth used on two-hop transmission may be derived as the following expression:

$$BW_{end-to-end} = 1/f(SNR_{access\_link}) + 1/f(SNR_{backhaul\_link})$$

Where the function $f$ represents the Shannon capacity formula:

$$f(SNR) = \log_2(1 + SNR).$$

In another embodiment, the function $f$ may be a mapping from the SNR to the particular MCS set based on predefined MCS mapping tables or curves. Each MCS has a corresponding spectrum efficiency value. In another embodiment, the function $f$ may be any mapping function from the SNR to the spectrum efficiency.

The final equivalent end-to-end SNR for two-hop radio communication can be derived to be equation 2, shown below:

$$SNR_{end-to-end} = f^{-1}(1/BW_{end-to-end}) = \quad \text{(Equation 2)}$$

$$f^{-1}\left\{\frac{1}{\frac{1}{f(SNR_{access\_link})} + \frac{1}{f(SNR_{backhaul\_link})}}\right\}$$

Where the function $f^{-1}$ represents the inverse Shannon capacity formula $f^{-1}(x) = 2^x - 1$, the mapping between the particular MCS set to the SNR based on predefined MCS mapping tables or curves, or any mapping function from the spectrum efficiency to SNR.

In another embodiment, the end-to-end SNR might simply be the minimum of the link quality of the access link and backhaul link. This approximation might be used in some cases because the effective spectrum efficiency that the UE receives might be bottlenecked by the limiting link, which may be either the backhaul link or the access link. In this case, the end-to-end SNR is defined as:

$$SNR_{end-to-end} = \min(SNR_{access\_link}, SNR_{backhaul\_link}) \quad \text{(Equation 3)}$$

Backhaul Link Quality in the Mobility Procedure in a Type 1 Relay Network

When the UE performs the mobility procedure described above, such as intra-frequency cell reselection or handover, the UE should choose the most suitable cell. The most suitable cell is normally the cell with the best composite link quality, according to the equations defined above.

Currently, in LTE Release 8, the UE may determine the cell link quality solely based on the measured RSRP. This procedure works well in single hop communications. In two-hop communications, the joint two-hop link quality may be considered instead. For example, from equation (1) or equation (2), if the backhaul link quality is fair, even though the access link quality is good, the overall link quality may not be good due to the backhaul link quality factor. Therefore, the backhaul link quality should also be considered when the UE determines the link quality for different neighboring cells, generated by either by RNs or eNBs, during the UE mobility procedure.

In addition, load leveling in a RN may be proportional to the backhaul link quality. For a weak backhaul link, it may be desirable for fewer UEs to be camped on the RN. Otherwise, as soon as the UE goes from IDLE to CONNECTED mode, significant signaling may be necessary to hand-over the UEs to other cells. Cell reselection criteria based on backhaul link quality can be used to control the RN loading.

IDLE Mode Versus CONNECTED Mode Requirements

In an embodiment, the requirements for a UE in IDLE mode versus a UE in CONNECTED mode may be different. For example, power consumption for a battery powered UE might be an important criteria, because the UE may be expected to spend a certain portion of its time in IDLE mode. Therefore, selection of the access node or the RN with the best observed SNR, on the direct link between the UE and the access node or only on the direct link between the UE and the RN, may be desirable in order to facilitate both the decoding of downlink transmissions and the transmission of uplink transmissions.

A UE in IDLE mode may only make occasional uplink transmissions, such as tracking area registrations and tracking area updates. The amount of cell resources consumed for these transmissions may be small. In addition, a slight increase in latency (due to multi-hop communications) may not be an issue, so a RN's backhaul link quality may be of less concern.

A UE in IDLE mode may monitor paging messages and may occasionally acquire or reacquire broadcast system information. Both of these operations may be facilitated by choosing the access node or RN with the highest observed SNR. In an embodiment, HARQ retransmissions may not be possible for paging messages, so a higher SNR helps to assure a correct decoding of any paging messages that are received. In addition, a higher SNR reduces the use of possible HARQ combining of system information transmissions, which in turn reduces the power consumption at the UE and the time required to acquire system information.

The above criteria may be considered when the UE is in IDLE mode. The following criteria may be considered when the UE is in CONNECTED mode.

It may be preferable for a UE in CONNECTED mode to minimize the amount of latency introduced by any multi-hop wireless links over one or more RNs and/or eNBs (especially with possible HARQ retransmissions introducing further latency). Thus, a RN's backhaul link quality may be taken into account in this situation.

A UE in CONNECTED mode may be expected to transfer large amounts of data, and therefore may have a significant impact on the total cell resources. Again, the quality of a RNs' backhaul link may be taken into consideration in this case.

From the above criteria for both IDLE and CONNECTED mode for a UE, in one embodiment, it may be preferable for a UE in IDLE mode to choose one particular Release 10 access node or cell, while the same Release 10 UE in CONNECTED mode and with the same network scenario may prefer to choose a different Release 10 access node. This situation may not be an issue in E-UTRA Release 8 (LTE) network deployments where the backhaul link quality need not be taken into account for cell selection or reselection, since RNs would not be present. However, this situation may be advantageously addressed in E-UTRA Release 10 (LTE-A) network deployments where RNs may be present.

The embodiments described herein contemplate at least four approaches to dealing with general mobility procedures for UEs (such as cell selection, cell reselection, handover procedure, etc) in multi-hop networks where the backhaul signal quality should be considered. These four solutions include IDLE mode cell reselection, CONNECTED mode handover, handover immediately following transition to CONNECTED MODE, and immediate cell reselection prior to entering CONNECTED mode. Each of these approaches is discussed in turn.

IDLE Mode Cell Reselection

For UEs in IDLE mode, the backhaul link quality of RNs may be taken into consideration by the cell reselection procedure. By taking into account backhaul link quality of RNs, the end to end link quality may be determined in order to perform the suitable cell reselection procedure. By knowing the end to end link quality, the overall spectrum efficiency may be improved. Calculation of the end to end link quality may be determined according to the equations defined above, as well as other techniques that will be readily apparent to one skilled in the art in light of this disclosure.

Connected Mode Handover

For a UE in CONNECTED mode, the backhaul link quality of relay nodes may be taken into consideration by the handover procedure. By taking into account backhaul link quality of RNs, the end to end link quality may be determined in order to perform the suitable handover procedure. By knowing the end to end link quality, the overall spectrum efficiency may be improved.

Possible Handover Immediately Following Transition to Connected Mode

A UE in IDLE mode might not take the backhaul link quality of relay nodes into consideration when performing cell reselection. When such a UE enters CONNECTED mode, the network may take the backhaul link quality into consideration when determining whether or not to perform a handover of the UE to a different cell, in order to improve the overall spectrum efficiency. In this scenario, the backhaul link quality need not be taken into consideration when the UE is performing cell reselection, while in IDLE mode, nor when the UE is moving to CONNECTED mode. However, the backhaul link quality may be taken into consideration after the UE enters CONNECTED mode. That is, the network may move the UE to another cell after the UE enters the CONNECTED mode after considering the backhaul link quality. This embodiment (which does not take the backhaul link quality into consideration during IDLE mode cell selection) is different than the CONNECTED mode handover embodiment described above, where there is a possibility that the UE may take the backhaul link quality into consideration while performing cell selection in IDLE mode (i.e. prior to moving to CONNECTED mode).

Intermediate Cell Reselection Prior to Entering Connected Mode

A UE in IDLE mode uses the current Release 8 cell selection or reselection criteria to choose a cell on which to camp. Using the Release 8 criteria, the cell with the best SNR, and which satisfies other relevant selection criteria such as the correct PLMN or other criteria, is selected. These criteria minimize UE power consumption while in IDLE mode.

When the UE moves to CONNECTED mode, such as when the UE is paged or when the user wishes to initiate a connection session, the UE may examine its recent and/or newly acquired measurements and/or system information from neighboring cells and/or additional information related to the backhaul link quality from the serving cell. In this case, the backhaul link quality may be considered as a parameter for intermediate cell reselection prior to entering connected mode. The UE may reselect to an appropriate neighbor cell before commencing the IDLE to CONNECTED mode transition. An appropriate neighbor cell is a cell in which the total expected consumption of cell resources is minimized.

In another embodiment, if the UE performs the IDLE to CONNECTED mode transition on the current serving cell, the corresponding serving cell access node can then, if necessary, configure the UE to perform and report measurements, as appropriate. These measurement reports can then be used to trigger a network-directed handover to a more appropriate access node that optimizes cell performance. In this case, the network directed handover may consider the backhaul link quality as a criterion for determining when to perform a handover and the target RN or access node to handover to.

If a UE is temporarily moving to CONNECTED mode for the purpose of performing a Tracking Area Registration or Tracking Area Update (TAU), then the UE need not reselect to a different cell. Instead, the UE may remain camped on the currently selected cell. In one embodiment, the NAS of the UE may indicate to the RRC of the UE that the RRC connection request is solely for performing TAU. Therefore, the UE need not reselect to another cell by considering the backhaul link quality as a parameter. In another embodiment, the eNB may be made aware that the UE is moving to CONNECTED mode solely for the TAU purposes to avoid triggering a CONNECTED mode handover to another access node. Several possible embodiments are described below.

In an embodiment, making the eNB aware of this information can be accomplished by modifying the IE (Information Element) EstablishmentCause in the RRCConnectionRequest message. The RRCConnectionRequest message is the first message that the UE sends to the eNB to initiate the RRC connection with the eNB when the UE tries to move from the IDLE mode to the CONNECTED mode. The current IE EstablishmentCause may include the following values: emergency, highPriorityAccess, mt-Access, mo-Signalling, mo-Data, and three spare values. In an embodiment, a new EstablishmentCause value may be defined, such as trackingAreaSignalling, to indicate that the RRC connection request is solely for TAU purposes using one of the spare values. Hence the network need not further consider the backhaul link quality for the possible network directed handover after the UE moves to CONNECTED mode.

As an alternative embodiment, if a TAU results in an EstablishmentCause of mo-Signaling being used within the RRCConnectionRequest message, then the eNB might not be allowed to take the relay backhaul link quality into consideration for handover determination. This restriction might be only for a fixed period of time, following a UE establishing an RRC connection, so that possible handovers based on the relay backhaul link quality would not be blocked for an extended period of time.

In the above solutions, the backhaul link quality in the overall link quality may be estimated or calculated. This estimation or calculation may be performed using the equations defined above.

In the embodiments described above, different components in a wireless network may perform the various functions described above. For example, an eNB and/or a RN could measure the backhaul link signal quality and transmit that information to the UE. The UE could measure the access link signal quality, or the RN/eNB could measure the access link signal quality and then transmit that information to the UE. The UE then may calculate the cell selection criteria according to the equations defined above. In another embodiment, an eNB or RN could maintain a list of neighbor cells and include in that list corresponding signal qualities for the various backhaul links and/or access links, and then transmit that list to the UE for use by the UE in determining cell selection criteria. In yet another embodiment, the RN and/or eNB could receive a measured access link signal quality from the UE, or alternatively directly measure the access link signal quality, and then calculate the composite signal quality according to the techniques described above. In this case, the RN and/or eNB could transmit the composite signal quality to the UE. Still further, the RN and/or eNB could calculate the cell selection or reselection factors and then transmit those factors to the UE for use in cell selection or reselection. Other combinations are possible with respect to which components perform which functions. Further, the above embodiments apply to any other mobility procedures for the UE as well, such as handover procedures.

Figure 3:
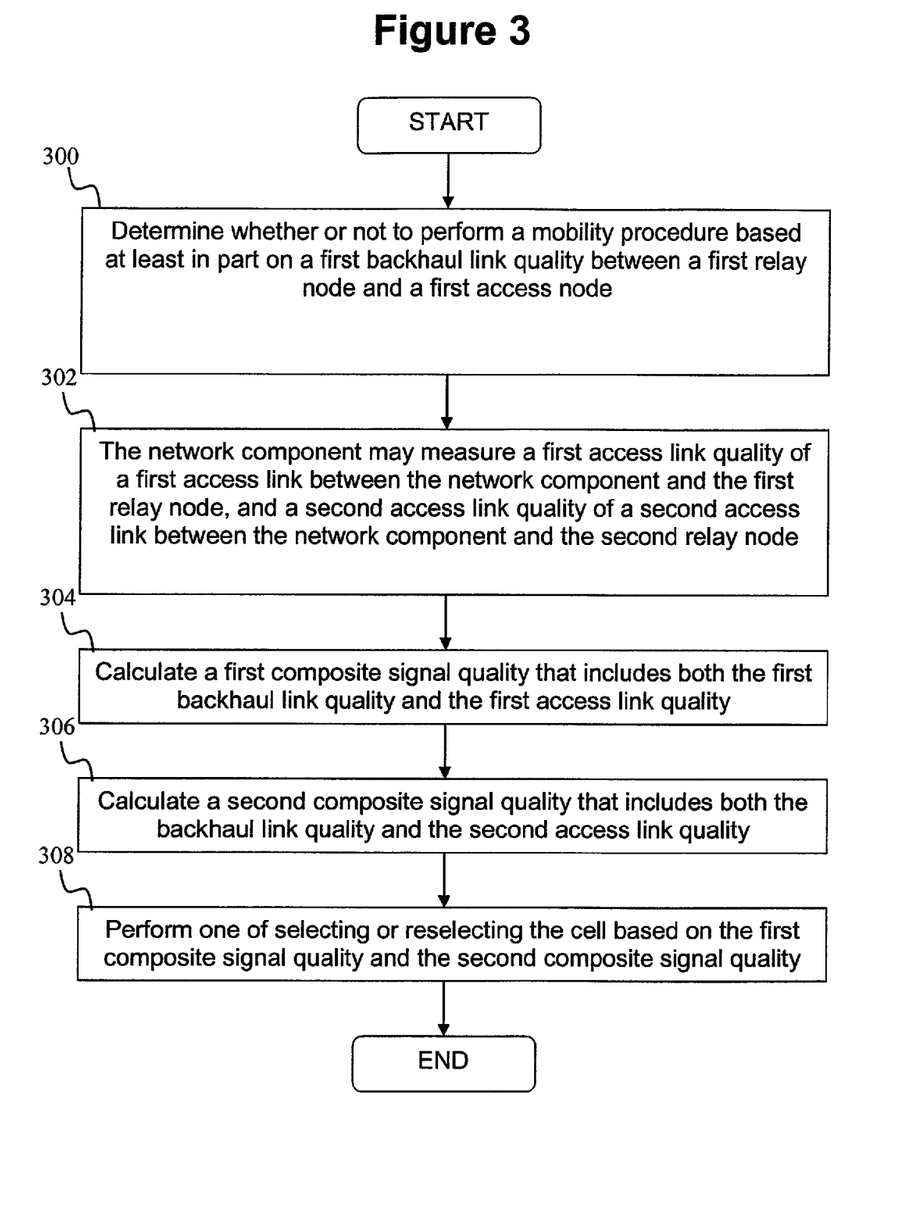
FIG. 3 is a flowchart illustrating a process of using a backhaul link quality to determine whether to perform a procedure selected from one of cell selection or cell reselection, according to an embodiment of the disclosure

FIG. 3 is a flowchart illustrating a process of using a backhaul link quality to determine whether to perform a procedure selected from one of cell selection or cell reselection, according to one embodiment of the disclosure. The process shown in FIG. 3 may be implemented in a UE, such as any of the UEs shown in FIG. 1, in the network component shown in FIG. 4, or in some other kind of network component. The process shown in FIG. 3 may be implemented using the techniques described with respect to either FIG. 1 or FIG. 2. The process shown in FIG. 3 is an exemplary process, and other processes may be recognized by those of skill in the art based on the description provided with respect to FIGS. 1 and 2 and elsewhere herein.

The process begins as the network component or the UE determines whether or not to perform a mobility procedure, such as cell selection or cell reselection, based at least in part on a first backhaul link quality between a first relay node and a first access node (block 300). The procedure could end here, or continue.

The UE may then receive a second backhaul link quality between a second relay node and a second access node. The UE or the network component may measure a first access link quality of a first access link between the UE and the first relay node, and a second access link quality of a second access link between the UE and the second relay node (block 302). Note that the first access node may or may not be the same as the second access node. The network component or the UE may measure the access link quality and might not need to be given that measurement by the network.

The network component or the UE calculates a first composite signal quality that includes both the first backhaul link quality and the first access link quality (block 304). The network component or the UE also calculates a second composite signal quality that includes both the backhaul link quality and the second access link quality (block 306). The network component or the UE then performs one of selecting or reselecting the cell based on the first composite signal quality and the second composite signal quality (block 308). The process terminates thereafter.

Figure 4:
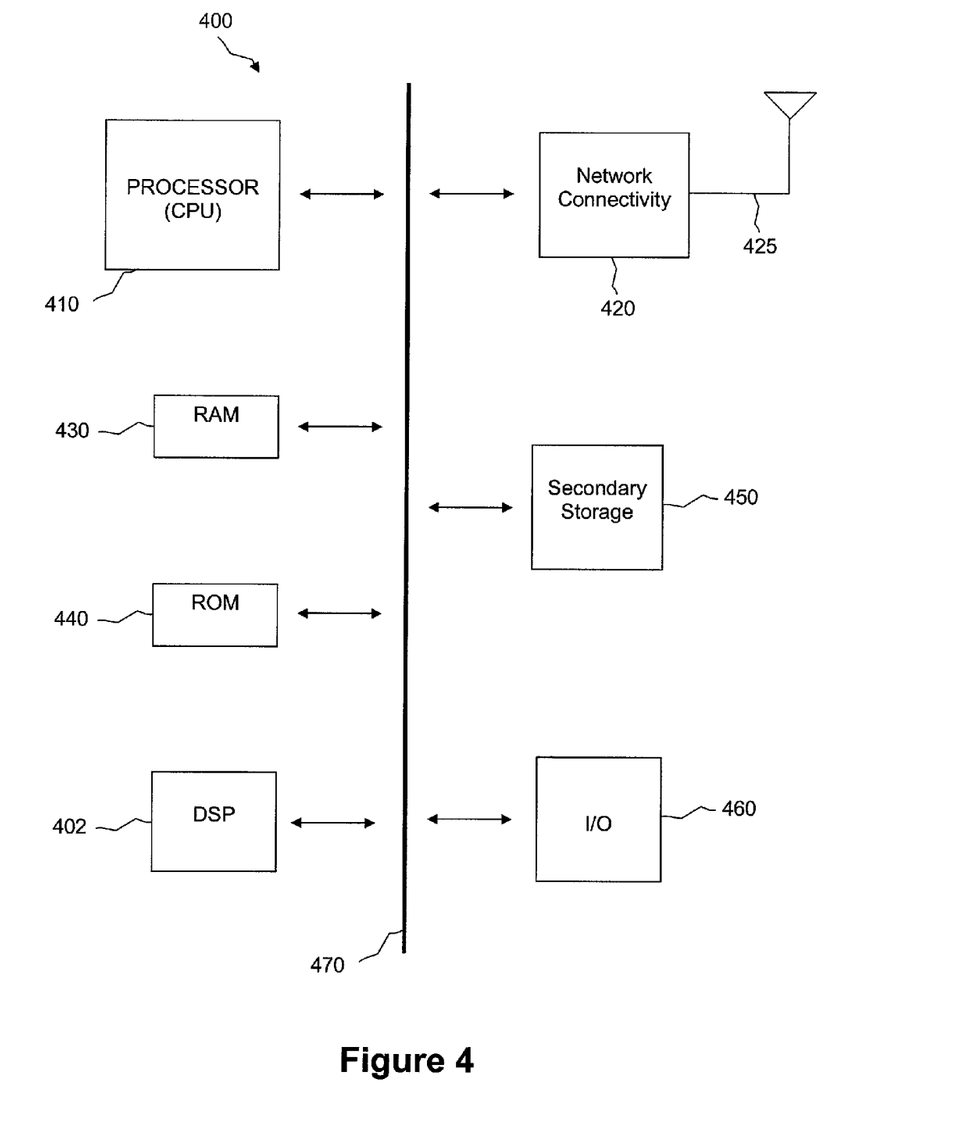
FIG. 4 illustrates an example of a system that includes a processing component suitable for implementing one or more embodiments disclosed herein.

The UEs, RNs, and access nodes, as well as other components described above, might include a processing component that is capable of executing instructions related to the actions described above. FIG. 4 illustrates an example of a system 400 that includes a processing component 410 suitable for implementing one or more embodiments disclosed herein. In addition to the processor 410 (which may be referred to as a central processor unit or CPU), the system 400 might include network connectivity devices 420, random access memory (RAM) 430, read only memory (ROM) 440, secondary storage 450, and input/output (I/O) devices 460. These components might communicate with one another via a bus 470. In some cases, some of these components may not be present or may be combined in various combinations with one another or with other components not shown. These components might be located in a single physical entity or in more than one physical entity. Any actions described herein as being taken by the processor 410 might be taken by the processor 410 alone or by the processor 410 in conjunction with one or more components shown or not shown in the drawing, such as a digital signal processor (DSP) 402. Although the DSP 402 is shown as a separate component, the DSP 402 might be incorporated into the processor 410.

The processor 410 executes instructions, codes, computer programs, or scripts that it might access from the network connectivity devices 420, RAM 430, ROM 440, or secondary storage 450 (which might include various disk-based systems such as hard disk, floppy disk, SIM (subscriber identity module) card, or optical disk, or other storage device). An application or other computer usable program code may be stored on any of these devices, or on some other storage device. While only one CPU 410 is shown, multiple processors may be present. Thus, while instructions may be discussed as being executed by a processor, the instructions may be executed simultaneously, serially, or otherwise by one or multiple processors. The processor 410 may be implemented as one or more CPU chips.

The network connectivity devices 420 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 420 may enable the processor 410 to communicate with the Internet or one or more telecommunications networks or other networks from which the processor 410 might receive information or to which the processor 410 might output information. The network connectivity devices 420 might also include one or more transceiver components 425 capable of transmitting and/or receiving data wirelessly.

The RAM 430 might be used to store volatile data and perhaps to store instructions that are executed by the processor 410. The ROM 440 is a non-volatile memory device that typically has a smaller memory capacity than the memory capacity of the secondary storage 450. ROM 440 might be used to store instructions and perhaps data that are read during execution of the instructions. Access to both RAM 430 and ROM 440 is typically faster than to secondary storage 450. The secondary storage 450 is typically comprised of one or more disk drives or tape drives and might be used for non-volatile storage of data or as an over-flow data storage device if RAM 430 is not large enough to hold all working data. Secondary storage 450 or may be used to store programs that are loaded into RAM 430 when such programs are selected for execution.

The I/O devices 460 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 425 might be considered to be a component of the I/O devices 460 instead of or in addition to being a component of the network connectivity devices 420.

Thus, the embodiments provide for a system including a processor configured to determine whether to perform a mobility procedure. Determining is based at least in part on a backhaul link quality between a relay node and an access node.

The embodiments also provide for a network component comprising a processor configured to determine and provide information related to backhaul link quality to a UE for use by the UE in a mobility procedure. The network component may be at least one of an RN or an access node.

The embodiments also provide for a method implemented by a processor. The method includes determining whether to cause a user equipment (UE) to perform a mobility procedure. Determining is based at least in part on a backhaul link quality between a relay node and an access node.

The following documents are hereby incorporated by reference in their entireties: TR 36.814 v. 1.0.0, "Further Advancements for E-UTRA, Physical Layer Aspects" 3GPP; TS 36.300 v V8.9.0 (2009-06); "Evolved Universal Terrestrial Radio Access (E-UTRA) and Evolved Universal Terrestrial Radio Access Network (E-UTRAN); Overall description; Stage 2 (Rel 8)"; R1-092419, "Type-II Relay Reference Signal Transmission and UE Association", RIM; 3GPP TS 36.213 V8.7.0 (2009-06), "Physical layer procedures (Release 8)"; 3GPP TS 36.331 V8.6.0 (2009-06), "Radio Resource Control (Release 8)"; and 3GPP TS 36.304 V8.6.0 (2009-06), "User Equipment (UE) procedures in idle mode (Release 8)".

The embodiments contemplate one or more computer readable media. The term "computer readable medium" refers to a tangible storage device which can store data and from which a processor or other electronic device may read data. However, the embodiments may also be embodied on transmission media, such as carrier waves. The embodiments may also be implemented in the form of a processor configured to perform the techniques described herein. A processor may be configured to perform a technique either by programming the processor with software, by physically designing a processor to perform a particular function, such as in the form of an application specific integrated circuit (ASIC), or by using other techniques well known to those skilled in the art.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. Also, for example, although the descriptions are only for two-hop communications, the similar approaches could apply to multiple-hop communications as well, for example, three-hops.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE) for use in a wireless communication system including an access node and a relay node, wherein the access node and the relay node are configured to establish a backhaul link, and wherein the UE and the relay node are configured to establish an access link, the UE comprising:
a processor configured to:
determine a composite, end-to-end signal to noise ratio, SNR, based at least in part on an SNR of the backhaul link and an SNR of the access link, and
determine whether or not to perform a mobility procedure, based at least in part on the composite, end-to-end SNR, wherein the composite end-to-end SNR is represented by Equation 1:

$$SNR_{end-to-end} = 1/(1/SNR_{access\_link} + 1/SNR_{backhaul\_link}) \quad \text{(Equation 1)},$$

wherein $SNR_{access\_link}$ is the SNR of the access link, and $SNR_{backhaul\_link}$ is the SNR of the backhaul link, and
wherein the mobility procedure is one of a cell selection procedure, a reselection procedure, and a handover procedure.

2. The UE of claim 1 wherein the processor is further configured to receive the backhaul link quality between the relay node and the access node.

3. The UE of claim 1 wherein the backhaul link is a first backhaul link between a first relay node and a first access node, and wherein the processor is further configured to:
receive an SNR of a second backhaul link between a second relay node and a second access node;
calculate a second composite SNR; and
determine which cell to use for the mobility procedure based on the first composite SNR and the second composite SNR.

4. The UE of claim 3 wherein the mobility procedure comprises determining the cell with the best composite SNR.

5. The UE of claim 1 wherein when the UE is in IDLE mode, the processor is configured to take into consideration the SNR of the backhaul link during a cell reselection or selection procedure.

6. The UE of claim 1 wherein when the UE is in CONNECTED mode, the processor is configured to take into consideration the SNR of the backhaul link in a handover procedure.

7. The UE of claim 1 wherein after the UE enters CONNECTED mode, the processor is configured to take the SNR of the backhaul link into consideration for the network-directed handover procedure.

8. The UE of claim 7 wherein the processor is further configured to transmit to the first access node an establishment cause in a radio resource control (RRC) connection request message, wherein the establishment cause is configured to inform the network component that the RRC connection request is for the purpose of performing one of a tracking area registration or a tracking area update.

9. The system of claim 1 wherein prior to the UE moving to CONNECTED mode, the processor is configured to take the SNR of the backhaul link into consideration when performing cell reselection.

10. The UE of claim 9 wherein, when the UE is moving to CONNECTED mode for the purpose of performing one of a tracking area registration or a tracking area update, the processor is configured to avoid reselecting to a second cell due to the SNR of the backhaul link.

11. The UE of claim 10 wherein a non-access stratum (NAS) of the UE indicates to a radio resource control (RRC) of the UE that an RRC connection request is for the purpose of performing one of a tracking area registration or a tracking area update.

12. The UE of claim 1 wherein when the UE is in CONNECTED mode, the processor is further configured to:
receive a network-directed request to transmit a measurement report generated by the UE; and
receive a network-directed request to be handed-over to a second cell that has a better composite signal quality with respect to the first cell.

13. The UE of claim 1, wherein the backhaul link quality is taken into account in CONNECTED mode but not in IDLE mode, and wherein in IDLE mode the UE selects the access node or the relay node as its direct link depending on which of the two links has the highest observed SNR.

14. A method for operating a user equipment (UE) comprising a processor in a wireless communication system including an access node and a relay node, wherein the access node and the relay node are configured to establish a backhaul link, and wherein the UE and the relay node are configured to establish an access link, the method comprising:
determining, by the processor, a composite, end-to-end signal to noise ratio, SNR, based at least in part on an SNR of the backhaul link and an SNR of the access link; and
determining whether or not to perform a mobility procedure, based at least in part on the composite, end-to-end SNR,
wherein the composite end-to-end SNR is represented by Equation 1:

$$SNR_{end\text{-}to\text{-}end} = 1/(1/SNR_{access\_link} + 1/SNR_{backhaul\_link}) \quad \text{(Equation 1)},$$

wherein $SNR_{access\_link}$ is the SNR of the access link, and $SNR_{backhaul\_link}$ is the SNR of the backhaul link, and
wherein the mobility procedure is one of a cell selection procedure, a reselection procedure, and a handover procedure.

15. The method of claim 14 wherein the backhaul link is a first backhaul link between a first relay node and a first access node, and wherein the method further comprises:
receiving an SNR of a second backhaul link between a second relay node and a second access node;
calculating a second composite SNR; and
determining which cell to use for the mobility procedure based on the composite SNR and the second composite SNR.

16. The method of claim 14 wherein the mobility procedure comprises determining the cell with the best composite SNR.

17. The method of claim 14 further comprising:
prior to the UE moving to CONNECTED mode, taking the SNR of the backhaul link into consideration when performing cell reselection.

18. The method of claim 14, wherein the backhaul link quality is taken into account in CONNECTED mode but not in IDLE mode, and wherein in IDLE mode the UE selects the access node or the relay node as its direct link depending on which of the two links has the highest observed SNR.

* * * * *